(12) United States Patent
Hendry (10) Patent No.: US 6,491,860 B1
(45) Date of Patent: *Dec. 10, 2002

(54) COUPLED FLUID INJECTION WITH FLOW CONTROL

(75) Inventor: James W. Hendry, Brooksville, FL (US)

(73) Assignee: Incoe Corporation, Troy, MI (US)

(*) Notice: Subject to any disclaimer, the term of this patent is extended or adjusted under 35 U.S.C. 154(b) by 85 days.

This patent is subject to a terminal disclaimer.

(21) Appl. No.: 09/593,567

(22) Filed: Jun. 14, 2000

Related U.S. Application Data (60) Provisional application No. 60/157,394, filed on Oct. 1, 1999.

(51) Int. Cl.⁷ ................................................ B29D 22/00
(52) U.S. Cl. ...................................................... 264/572
(58) Field of Search ........................... 264/572; 425/130

(56) References Cited

U.S. PATENT DOCUMENTS

| 5,344,596 A | | 9/1994 | Hendry |
| 5,948,446 A | * | 9/1999 | Hori ............................ 425/130 |

* cited by examiner

Primary Examiner—Suzanne E. McDowell (57) ABSTRACT

A gas assisted molding apparatus having gas introduced into the plastic charge as the charge is flowing into the mold cavity. The gas and plastic are simultaneously injected into the mold cavity and the gas can be introduced at the nozzle end or barrel of the injection molding machine. Optionally, the gas may be injected into a hot runner manifold or into the cavity itself simultaneously with the plastic. The apparatus includes a conventional gas injection mold, a source of inert gas, such as nitrogen, and an injection assembly. A common power source is used for both the injection of the plastic and the gas to assure simultaneous inflow of both the gas and the molten plastic at the same pressure.

42 Claims, 8 Drawing Sheets

(PRIOR ART)
FIG.1

(PRIOR ART)

FIG. 2

(PRIOR ART)

COUPLED FLUID INJECTION WITH FLOW CONTROL

CROSS-REFERENCE TO RELATED APPLICATIONS

This application claims priority from U.S. Provisional Patent Application Ser. No. 60/157,394, filed on Oct. 1, 1999.

This is one of four related applications all being filed on the same day:

1. Coupled Fluid Injection With Same Power Source, filed on Jun. 14, 2000, Ser. No. 09/594,537;
2. Coupled Fluid Injection With Simultaneous Injection, filed on Jun. 14, 2000, Ser. No. 09/593,340;
3. Coupled Fluid Injection With Flow Control, filed on Jun. 14, 2000, Ser. No. 09/593,567; and
4. Coupled Fluid Injection With Volume Determined By Pressure, filed on Jun. 14, 2000, Ser. No. 09/593,222.

TECHNICAL FIELD

The present invention relates generally to a method and apparatus for the injection of gas and plastic into a mold cavity. More particularly, the present invention relates to a method and apparatus for plastic injection molding in which a predetermined quantity of a pressurized inert gas is introduced into a quantity of plastic melt while the melt is flowing from the barrel into the mold cavity.

BACKGROUND OF THE INVENTION

Injection molds typically comprise stationary and moving mold halves (i.e., the core side and the cavity side) which are closed and clamped together to form a mold cavity therebetween for shaping articles from thermoplastic compositions. The thermoplastic is heated into a molten condition and is injected under pressure through a nozzle and into the mold cavity by means of a screw ram. Injection pressures of 2,000 to 10,000 psi are common at the gate locations. The plastic is allowed to cool to sufficiently harden the thermoplastic whereupon the mold is opened and the hardened articles are removed.

A traditional plastic molding problem is the formation of surface distortions or "sink marks" on the appearance side of the molded article opposite to ribs or bosses on the backside of the article and resulting from the high injection pressures used to fill the cavity, the pack out pressure, and/or from an uneven pressure gradient resulting from the injection pressure at the gate being higher than the pressures at the extreme ends of the molded article. High injection pressure can cause strain marks or molded-in strain in the hardened article, resulting in warpage at once, or over a period of time after molding, or if the end use of the molding is in a high temperature area. When ribs are formed in the moldings, the wall thickness versus rib configuration can cause the ribs to buckle or bend the molding, due to shrinkage differential. In large projected area moldings where the plastic cannot flow from the gate to the end of the molding, hot runner molds are needed and high clamping forces (e.g., 1,000 to 10,000 pounds per square inch of projected area) are required to hold the mold halves together. These molds are costlier to build, and the gates from the hot runners can add weld lines to the molded product. Injection molding machines which can provide these high clamping forces are costly to operate.

The molding of thick-sectioned parts presents its own demands. One of the approaches taken in the molding of such parts is the use of structural foam. A part produced according to this process is relatively light in weight. However, the surface finish of such a product is poor and typically requires extensive finishing operations. Also, the method required for molding structural foam parts is cumbersome, since it necessitates relatively long cycle times (for the cooling of the plastic in the mold). The requisite method also produces parts having inconsistent surface finishes due to streaking. As the flowing plastic material enters the mold cavity, bubbles produced by the foaming agent can form at the front of the flow near the point of entrance. Streaking results as the flowing material passes by the bubbles.

Another approach taken in the molding of thick-sectioned parts is a process that has come to be known as "gas assisted injection molding" in which an inert gas is injected through the plastic injection nozzle and directly into the thick areas of the melted thermoplastic, thereby creating hollow sections in the part. According to known gas assisted injection molding methods, the gas is injected after the molten plastic resin has substantially filled the mold cavity. With such conventional gas assisted molding process, sink marks and warpage can be minimized and possibly be eliminated. The gas forms hollow portions in the body of the material and/or hollow channels (gas channels) in the thicker portions, such as between the surface of the part and a backside detail, such as a rib. For ribbed products, the base of the ribs must be made thicker or wider in order to help direct the gas channel, which is just the opposite of normal design practice with plastic where ribs are made as thin as possible to try to eliminate shrinkage and shorten cooling and cycle times. With the gas channel at the base of a rib, material will shrink away from the inside surface of the channel as the molded part cools because the material is hottest at the center of the section. Therefore, as the plastic part shrinks during cooling, the sink marks on the visible outside surface of the parts can be minimized.

A disadvantage in conventional gas assisted molding technology is that the possibility of achieving Class A surfaces on the appearance surfaces of the molded parts is inhibited by shadow marks caused by gas holes in the thicker areas of the molded articles, and gas permeation caused by the gas not being retained in the thicker areas and overflowing into the wall thickness of the articles. This often causes thinning and weakening of the wall, raised areas, and blush marks.

Injection molding of parts utilizing a pressurized gas source is shown, for example, in U.S. Pat. No. 5,344,596, issued on Sep. 6, 1994, to Hendry for METHOD FOR FLUID COMPRESSION OF INJECTION MOLDED PLASTIC MATERIAL. While the method of this patent represents an improvement in the molding of articles of the type shown therein through the use of a gas, there remains a need for improvements in forming low cost articles.

SUMMARY OF THE INVENTION

Accordingly, it is an object of the present invention to provide an improvement to the art of gas assisted plastic injection technology. An additional object of the present invention is to provide a gas assisted molding method and apparatus that reduces the overall cost of gas delivery systems normally associated with gas assisted injection molding.

A still further object of the present invention is to provide such a method and apparatus which demonstrates reduced costs through, for example, electric power consumption. Yet another object of the present invention is to provide such a method and apparatus which demonstrates reduced costs through, by way of a further example, eliminating costly gas units.

A further object of the present invention is to provide such a method and apparatus which demonstrates reduced costs through, by way of yet an additional example, eliminating sophisticated and costly electrical conduits. Still a further object of the present invention is to provide such a method and apparatus which eliminates the need for a high pressure gas compressor and its associated maintenance problems.

Still an additional object of the present invention is to provide such a method and apparatus which eliminates the need for spillover of molten material into a spillover cavity. Yet a further object of the present invention is to provide such a method and apparatus which eliminates shadow, permeation, and hesitation marks.

An additional object of the present invention is to provide such a method and apparatus which relies upon the same power source to inject both plastic and gas. A further object of the present invention is to provide such a method and apparatus which eliminates clogged gas injection pins by eliminating the need for the pin itself in the mold cavity.

Yet an additional object of the present invention is to provide such a method and apparatus which allows for the use of lower cost pins outside of the mold cavity in the plastic flow. An additional object of the present invention is to provide such a method and apparatus which allows the steps of the process to be controlled by linear distancing, thus eliminating the need for a controlling timer.

Still a further object of the present invention is to provide such a method and apparatus which establishes a correct volume and pressure of gas prior to the step of plastic injection. Still a further object of the present invention s to provide such a method and apparatus which allows relatively easy yet accurate control of gas volume as well the gas pressure.

Yet a further object of the present invention is to provide such a method and apparatus which allows for the relatively easy change of both gas volume and pressure as required from task to task. An additional object of the present invention is to provide such a method and apparatus which relies upon a low-cost, low-maintenance, low pressure unit. A further object of the present invention is to provide such a method and apparatus which allows for the introduction of gas into the melt flow at a controlled rate as opposed to a single shot, thus creating a virtually continuous gas flow.

These and other objects of the present invention are achieved by the provision of a gas assisted molding apparatus having gas introduced into the molten plastic charge as the charge is flowing into the mold cavity. The gas and plastic are simultaneously injected such as in the barrel or at the nozzle end of the injection molding machine. Optionally, the gas may be injected into a hot runner manifold or into the cavity itself simultaneously with the plastic. The apparatus includes a conventional gas injection mold, a source of inert gas (such as nitrogen), and an injection assembly. A common power source is used for both the injection of the plastic and the gas. This insures that the gas and plastic will flow together into the mold in a simultaneous manner and at the same pressure. (Conversely, using separate power sources, one for plastic and the other for the gas, will result in one fluid overcoming the other, thus providing an unacceptable product.)

The gas is introduced into the plastic at any point of the process while the plastic is being injected. The volume of plastic is pressure-dependent upon the desired volume and pressure of the gas. According to the method, the screw in the injection barrel is rotated to deposit a preferred quantity of plastic (less the anticipated gas volume) in the front of the barrel. The molten plastic is forced into the mold by moving the screw longitudinally forward in the barrel by the hydraulic system normally incorporated into the injection molding machine. During the movement of the screw at any time during the injection stroke, a measured amount of gas is injected into the plastic melt through an injection nozzle (or pin) into the flowing molten plastic material using the same hydraulic pressure used to move the screw to inject the plastic out of the barrel and into the mold cavity. The injection of gas into the plastic is accomplished by operating a hydraulic cylinder to compress the gas in a gas chamber until it reaches a value equal to the pressure of the plastic located in the front of the barrel. The power to activate the hydraulic cylinder is flow-coupled to the hydraulic pressure used to force the plastic out of the end of the barrel. In this situation, the gas pressure at the pin equals the pressure moving the plastic by the screw into the mold, thus resulting in the simultaneous injection of plastic and gas into the mold to create a hollow article. The components of the system are then reset to their predetermined positions in preparation of the next molding cycle.

In alternate embodiments, the plastic could be injected by an electric or pneumatic operated mechanism and the gas could be injected into the molten plastic materials by the same power source and at the same pressure.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which.

DESCRIPTION OF THE PREFERRED EMBODIMENT(S)

The drawings disclose the preferred embodiments the present invention. While the configurations according to the illustrated embodiments are preferred, however, it is envisioned that alternate configurations of the present invention may be adopted without deviating from the invention as portrayed.

The various figures illustrate a molding apparatus and method for forming a molded component having a hollow portion. The operational steps generally include melting or plasticizing a solid thermoplastic material, feeding the plasticized material into an extruder barrel having an end closed by a valve, and continuously moving an elongated screw ram from its first withdrawn, pre-injection position to its bottomed-out position at which point the gas-plastic combination has been injected into the mold cavity. At a time between the first position of the screw to its bottomed-out or final position, a charge of gas is injected into the plasticized flow while it is being injected into the mold cavity. The injection of gas may be stopped and started along the cycle or may be continuous. However, it is not begun until after plastic begins to flow out of the injector and past the injection pins or devices. Simultaneous injection is accomplished by a single power source which brings the pressure level of the injected gas up to the pressure level of the molten plastic material. Variations of this method and apparatus include the arrangements of providing the gas injector pin adjacent the injector nozzle in the injection apparatus, including one or more gas pins in the hot runner manifold, or including one or more gas pins in the mold body itself.

It should be appreciated that the term "thermoplastic material" is used throughout the specification to reference the material which forms an injection molded plastic part. It should be appreciated that any type of thermoplastic material may be used in the injection molding process of the present invention. For example, general purpose plastics such as polyolefins, polystyrene, ABS resins (such as Cycolac, a trade name of General Electric, or Kryplastic, a trade name of UniRoyal), AS resins, PVC resins, methacrylic resins and fluorine-based resins may be used. In addition, engineering plastics such as nylon, saturated polyester resins, polycarbonate resins, polyacetal resins, polysuifones and modified polyphenylene ether resins may be used. Further, fiber reinforced resins may also be used in the gas-assisted injection molding process of the present invention.

The article produced according to the method and apparatus of the present invention is relatively light weight and demonstrates weight and finish characteristics that are improved over products produced according to known methods. The article molded according to this process is a low-cost product and is of good quality.

The common power source for the plastic and gas injection can be hydraulic, electric, pneumatic, or any other conventional power source which can be utilized in a gas-resin injection molding process.

Figure 1:
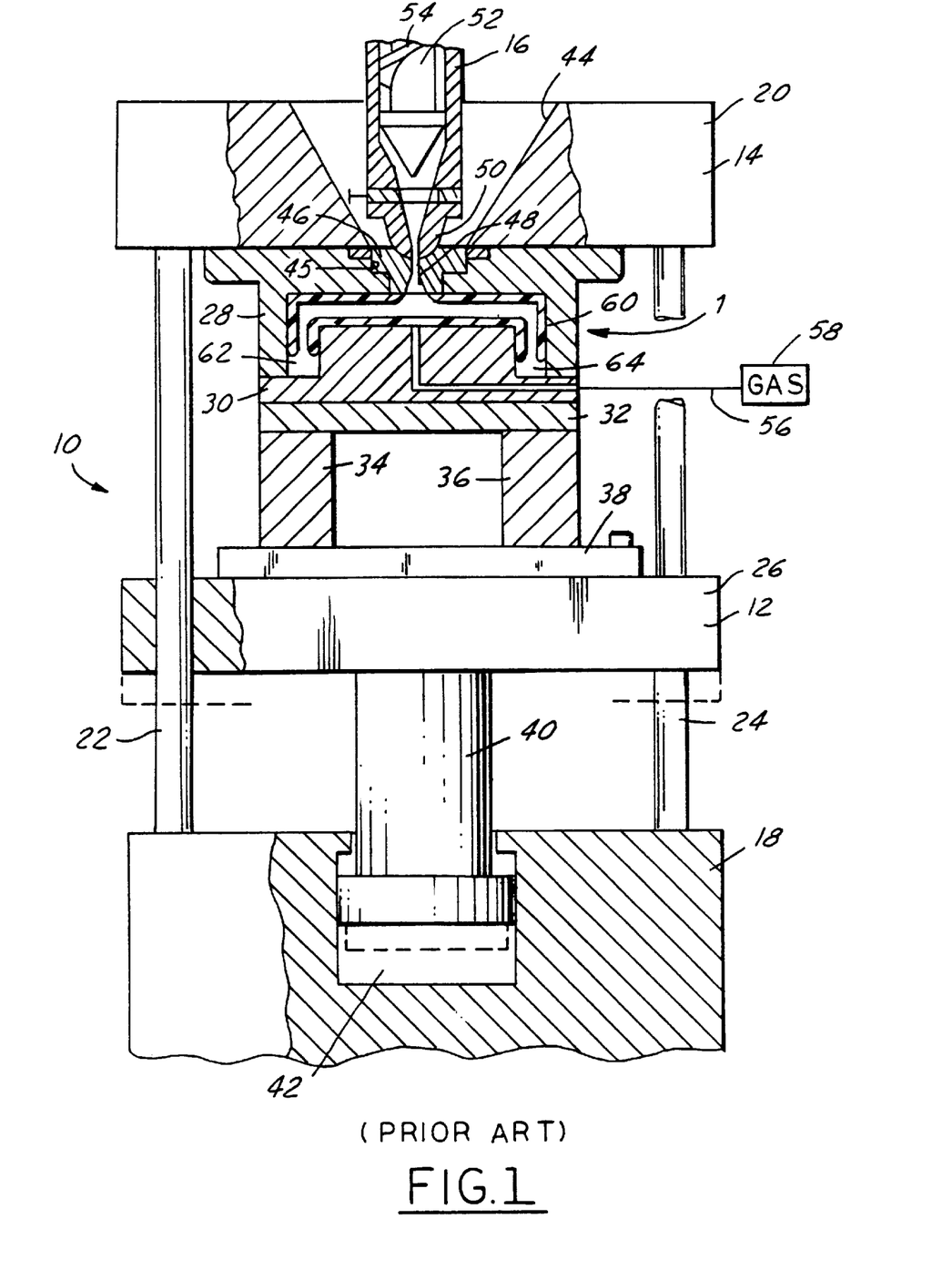
FIG. 1 is a cross-sectional view of a mold cavity in conjunction with a mold assembly illustrating a blown-out gas-plastic combination representing a first classic problem of prior art gas-assisted injection molding methods.
Figure 2:
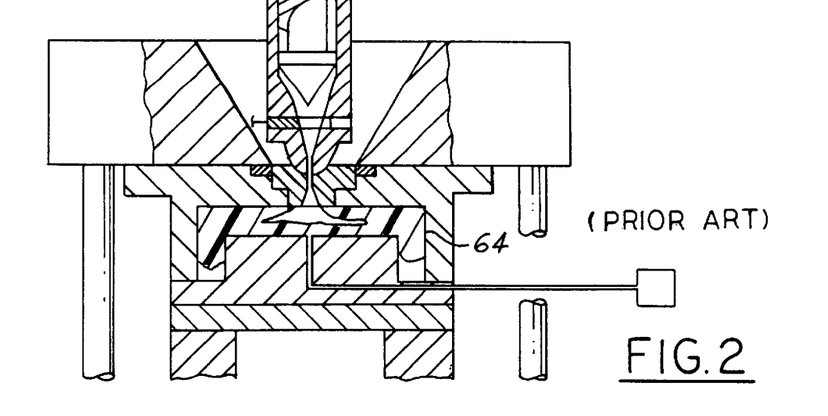
FIG. 2 is a cross-sectional view of a mold cavity in conjunction with a mold assembly illustrating the initial phase of an injection of a gas-plastic combination.
Figure 3:
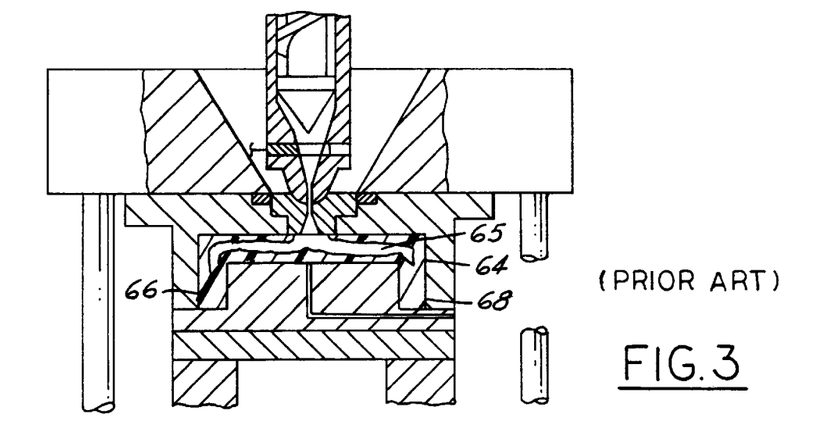
FIG. 3 is similar to the view of FIG. 2 but illustrates the mold cavity filled with the gas-plastic combination resulting in solid ends in the molded article representing a second classic problem of prior art gas-assisted injection molding methods.

By metering the inflowing gas, the present invention provides relief from several of the problems caused by known gas assisted plastic molding procedures. Some of these more difficult problems are illustrated in FIGS. 1 through 3 and are described in conjunction therewith. The primary problems are gas blow out and undesirable solid portions.

FIG. 1 is a cross-sectional view of a mold cavity, generally illustrated as 1, in conjunction with a mold assembly, generally illustrated as 10, which demonstrates the blown-out gas-plastic combination and represents a first classic problem of prior art gas-assisted injection molding methods. As is known in the art, the mold assembly 10 includes a movable portion 12 and a fixed portion 14, and a thermoplastic delivery portion 16. The fixed portion 14 actually includes a pair of spaced-apart fixed platens 18, 20. The fixed platens 18, 20 are fixed with respect to each other by support rods 22, 24 which maintain the preferred distance therebetween. The movable portion 12 comprises a movable platen 26 which is slidably disposed upon the support rods 22, 24.

The mold cavity 1 is defined between two mold halves 28, 30. The half 28 is a fixed half and is fixedly mounted to the fixed platen 20. The half 30 is a movable half and is fixedly mounted to a plate 32 which is itself mounted to a pair of support pillars 34, 36. The pillars 34, 36 are releasably fixed to the movable platen 26 through a removable plate 38. The mold halves 28, 30 form an article defining cavity between them, and the cavity designs illustrated in the figures are only exemplary. Of course, as is known in the art, the mold halves 28, 30 may be interchanged with other mold halves (not shown) as desired for the production of different parts.

A hydraulically driven clamping ram 40 is provided to selectively control the movement of the movable mold portion 12. The hydraulically driven clamping ram 40 is fixed to one end of the movable platen 26 and, at its other end, communicates with a variable volume chamber 42 formed substantially within the stationary platen 18 to drive the movable mold half 30 into and out of abutting contact with the stationary mold half 28. The variable volume chamber 42 is connected to a hydraulic fluid path as is known in the art. The fluid path is similar to that described in U.S. Pat. No. 5,344,596 to Hendry, which is incorporate herein by reference.

Referring to the thermoplastic mold portion 16, the fixed platen 20 has an aperture 44 defined therein and in which the thermoplastic delivery portion 16 is positioned. A sprue bushing 46 is nested within aperture 45 in mold portion 28 and includes a sprue 48 formed axially through its length. A molded machine nozzle 50 is fitted tightly against the sprue bushing 46 and selectively supplies flowable thermoplastic material to the system 10 through a screw plunger 52 which is in communication with a thermoplastic material supply.

An inert gas (such as nitrogen) is used to create a hollow portion in the resulting part. The gas is delivered to the cavity 1 by a gas supply line, shown as an example as line 56. The line 56 is fluidly connected to a gas supply source, shown schematically at 58.

As noted briefly above, one of the problems with known gas delivery systems is their tendency to create a blow out of gas through one or more portions of the molded part. This is basically the result of being unable with known technology to control the speed of the gas entering the mold cavity, which is typically a blast or shot of gas. Without controlling the speed of the gas entering the mold cavity 1 by methods such as metering, the result is "blow out" of one or more portions of the part being molded when there is not enough plastic already in the cavity. The blown-out ends are illustrated as 62, 64 of FIG. 1.

If "blow out" results from too much gas entering the cavity compared to the amount of thermoplastic material, another problem—an opposite problem—results if the speed of the gas is inadequate compared to the amount of thermoplastic material already in the cavity 1. This problem is illustrated in FIGS. 2 and 3. According to this problem, the distal ends of the part being molded, that is, the portions of the part being molded that are furthest from the entry port for the gas, tend to be too thick with thermoplastic material. FIG. 2 illustrates an amount of thermoplastic material 64 which has been injected into the cavity 1 at the middle stage of the injection process. FIG. 3 illustrates the injection process completed, with the thermoplastic substantially filling the cavity 1. As may be seen, due to problems in controlling the speed of the entering gas as represented by the prior art, only a relatively small amount of gas, generally illustrated as having formed a cavity 65, has entered the part. The result is an undesirable part which has very heavy ends or distal portions 66, 68.

Through the metering process of the present invention, the above problems of blow out and excessive plastic formation are avoided. In general, the gas pressure unit of the present invention delivers a pressurized gas to an injecting plastic at any point during the injection of the plastic into the mold, at a controlled rate, and at pre-calculated amounts to insure desired results.

More specifically, the precise volume of gas injected into the flowing plastic dictates the final gas pressure within the cavity. For example, if a molding dictates a 10% reduction in the volume from the total 100% volume of the mold cavity, then 90% by volume of plastic must be accumulated in the injection chamber of the screw ram cylinder. The remaining 10% of the volume of the cavity is gas, pre-pressurized to the pressure of the plastic molding machine, which is required to inject the plastic into the cavity.

For example, if 5,000 psi (350 Kg cm$^2$) is required to inject the plastic into the mold cavity, then the above-mentioned 10% volume, at a pressure of 350 Kg cm$^2$, is made available, ready-to-use, in making the molding prior to the plastic injection step being initiated. When these steps are taken, the resulting pressure within the molding will be 5,000 psi.

If, on the other hand, 350 Kg cm$^2$ is too high a gas pressure and again, by way of example, then only 5% gas by volume of the mold cavity will be accumulated at this pressure. Accordingly, only 95% of the total volume of plastic and gas will be needed to make the molding. The result is that the gas at a volume of only 5% will expand to fill the mold cavity to 100%. This will result in the reduction of gas pressure at the end of the filling cycle to 175 Kg cm$^2$ with a space occupied in the molding equaling 10%.

The opposite is also true. If more than 10% of the gas volume needed to fill the cavity completely is accumulated and 90% of the volume of the cavity is thermoplastic, at the desired pressure, then the terminal pressure will be higher than 350 Kg cm$^2$ because only 10% of the volume of the cavity is available for gas. Venting of the gas from the molding is done by programming the gas entry to stop just as the injection ram has stopped injecting the accumulated quantity of plastic needed to make the molding. The gas will also be present in an aperture of the sprue, the runner, the gate or the molding. The gas is vented at the time of the sprue break. Alternatively, the gas may be vented in the runner or in the article.

The method of the present invention allows for gas entry to be placed in the barrel or nozzle of the molding machine, in a hot sprue, in a hot drop, in a hot runner manifold, or in multiple hot drops in the hot runner manifold. These features are set forth and discussed below. It is also possible to inject the gas into the resin in the mold cavity.

In any event, according to the present invention, the inflow of gas can be stopped at any time after it has started to be injected during the plastic injection step, or the gas may be left on after all of the plastic has been injected. In this latter scenario, the gas will be shut off when the screw begins operation.

Importantly, according to the present invention, the gas may be injected into the plastic during the injecting process at any point (at any distance) during the injection of the plastic into the cavity of the mold. This insures that the gas will penetrate the thick sections of the molding to allow the gas to extend its flow to the extreme end of the molding, thus avoiding the problems discussed above with respect to FIGS. 2 and 3.

The ability to accurately control the ratio of plastic to gas, in a simple and fast manner, makes it possible according to the present invention to easily arrive at the correct ratio of plastic to gas to produce high quality parts.

An example of the flexibility of the present invention is presented hereafter. Note that the figures used are intended to be exemplary and not limiting. Given that volume of the mold cavity equals 100%, a 30% reduction of the part to be molded (by volume) equals weight reduction. If the injection chamber has accumulated 70% of the total volume of the mold cavity in the form of a molten mass of plastic, a volume of gas is accumulated equal to 30% of the total volume of gas at a pre-determined pressure which is equal to the plastic injection pressure. During the injection of the 70% of molten plastic in the cavity, at a pre-selected point in the injection stroke, the injection of the pre-stored, pre-determined quantity of gas is initiated. This may occur at any time during the continuing injection of the remnant of the 70% of the molten plastic into the cavity or may occur after the complete injection of the pre-determined 70% of the plastic. The injection of the total pre-determined amount of gas will have been injected into the stream of the molten plastic. The resulting molding will be a combination of 70% plastic and 30% void (by volume) and will be sink-free, strain-free, dimensionally stable, and exhibit a Class-A finish.

The present invention offers numerous advantages which are set forth below:

The present invention has the ability to change the volume of gas readily. The ability to change the volume of gas needed to make the molding is accomplished by simply changing the pressure of the gas that first enters the gas compression chamber. For example, if 5000 psi is needed to inject the gas, a pre-charge first pressure of 200 psi. is accumulated. This results in "Z" volume of gas when the pressure of the gas rises, under compression, from 200 psi to 5000 psi. If this amount of pressure is not enough, then the first pressure may be readily increased to 400 psi. This results in a gas volume of Z×2, or 800 psi. This same formula may be used to create any desired pressure, for example, Z×2×2, etc.

The present invention also has the ability to produce an exact ratio of plastic to gas. In the new system, the ratio of plastic to gas may be easily changed. A wide range of plastic-to-gas ratios of 50%–50% up to 98%–2% can be used successfully. This is accomplished by providing a single power source for injecting both the gas and the plastic. Prior art gas assisted injection molding machines have relied on the gas being driven by one source and the plastic being driven by a second source. However, it is impossible to match the two separate power sources, since one will overcome the force of the other. A single power source, as set forth in the present invention, overcomes this problem.

The present invention further has the ability to dictate the final gas pressure within the molding. For example, if gas is present at 10% by volume at 5000 psi and there is 90% plastic, resulting in 5000 psi, in the molding. On the other hand, if gas is present at 5% by volume at 5000 psi and there is 90% plastic, resulting in 2500 psi in the molding. Still further, if gas is present at 2.5% by volume at 5000 psi and there is 90% plastic, resulting in 1250 psi in the molding. In this regard, the pressure of 5000 psi is only exemplary, as the pressure could well be from 1000 psi or less to 10,000 psi or more. Of course, commercial reasons will dictate the pressure used, as the lower the gas pressure in the molding, the less gas will be used, thus reducing material costs. For example, polyethylene might take only 4000 psi, while polycarbonate might take 6000 psi, and xenoy might take 8000 psi. These different requirements are compensated for by adjusting the pressure switch in the gas compression line to whatever pressure is required to allow the gas to match the injection pressure of the plastic.

In accordance with the present invention, the injection of the gas into the thermoplastic flow may be initiated at any time during the plastic injection step and may be stopped at any time. For example, the injection of gas may begin before all the plastic is injected, just as the plastic injection step is completed, or after the plastic is injected. The gas can be injected into the flowable plastic after 1%–99.9% of the plastic material has been injected from the extruder barrel.

The present invention further provides an efficient piston stroke movement. Specifically, the gas compression chamber and its piston move a full stroke on every cycle, that is, if a 10-inch stroke is used, the piston moves in a first direction 10 inches and back in a second direction 10 inches. However, the volume of the chamber never changes. Instead, to change the volume of gas, the initial gas pressure is increased or decreased as set forth above. In addition, the recharging of the gas compression chamber with a gas pressure of 100 to 1500 psi enables the gas piston to move to its fully retracted position, thus eliminating any need for hydraulic pressure to pull the piston down.

Another advantage of the present invention is that the gas in the compression chamber is pre-pressurized. For the sake of efficiency, the gas in the compression chamber is pre-pressurized to the selected pressure, for example, the exemplary amount of 5000 psi discussed above. This is done prior to the subsequent cycle to make sure that the correct volume of gas is available at the correct pressure. If it is at once available to be injected into the flowing plastic at the desired parameters, there will be no need to wait for the hydraulic chamber to travel some distance while the plastic is being injected to reach the correct injection pressure.

As a still further advantage, there is no overheating of the seals with the present invention. Because the piston and its seal in the gas compression cylinder move slowly during compression (by way of example, 60 to 120 inches per minute), the seal does not overheat, thus resulting in increased seal life.

Figure 4:
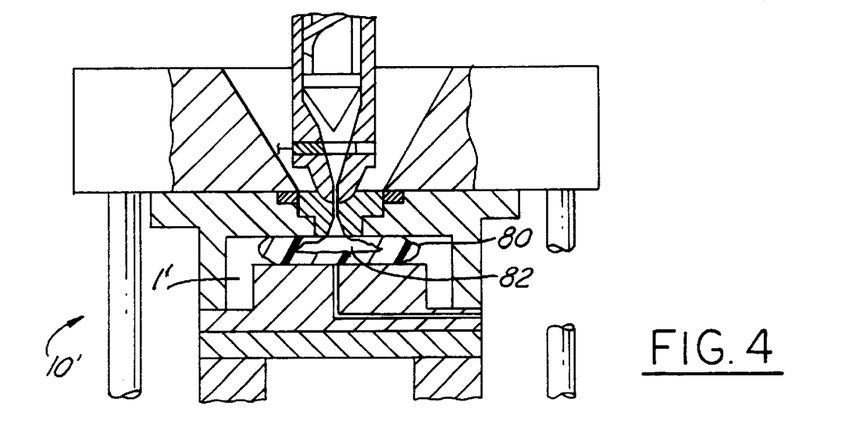
FIG. 4 is a cross-sectional illustration of a mold cavity in conjunction with a mold assembly with the gas-plastic combination having been initially injected.
Figure 5:
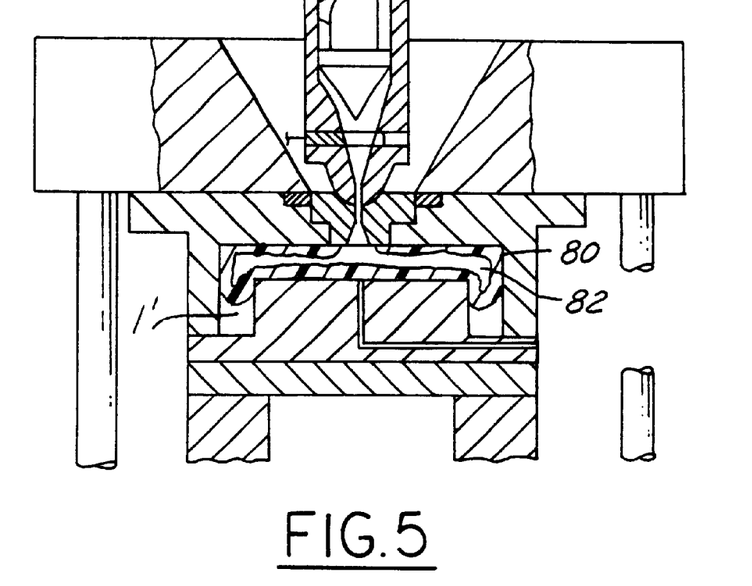
FIG. 5 is similar to the view of FIG. 4 but illustrates the gas-plastic combination having proceeded further into the mold cavity.
Figure 6:
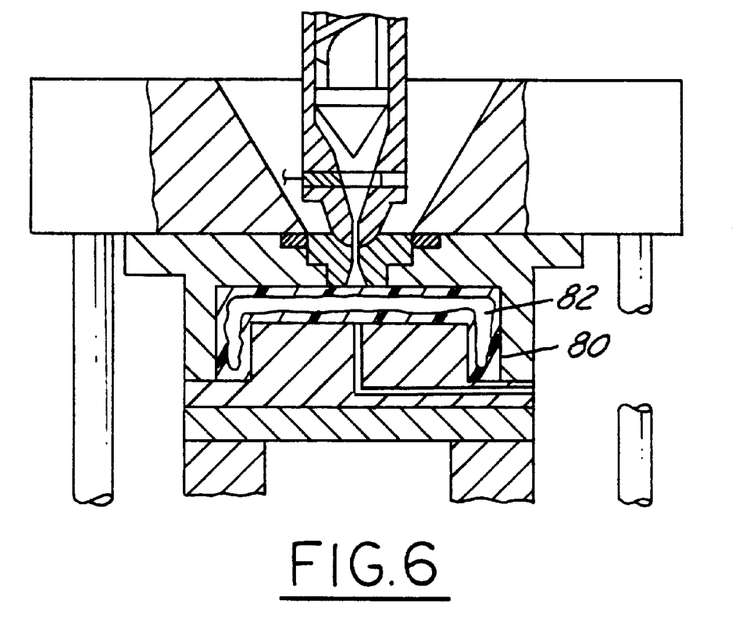
FIG. 6 is similar to the view of FIG. 5 but illustrates the gas-plastic combination having proceeded to its maximum place in the mold cavity.

FIGS. 4 through 6 illustrate how the metered, pre-pressurized, speed-controlled gas of the present invention successfully operates to provide a desired part. With respect first to FIG. 4, a cross-sectional illustration of a mold cavity, generally illustrated as 1'. in conjunction with a mold assembly, generally illustrated as 10', is illustrated with a shot or charge of molten thermoplastic material, generally illustrated as 80, having been initially injected.

FIG. 5 is similar to the view of FIG. 4 but illustrates the gas-plastic combination having proceeded further into the mold cavity 1'. According to this view, the amounts of both the thermoplastic 80 and the gas have increased within the cavity 1', thus resulting in a larger cavity 82.

FIG. 6 is similar to the view of FIG. 5 but illustrates the gas-plastic combination having proceeded to its maximum place in the mold cavity. It may be seen that the gas cavity 82 is uniformly formed within the shot of thermoplastic 80.

Figure 7:
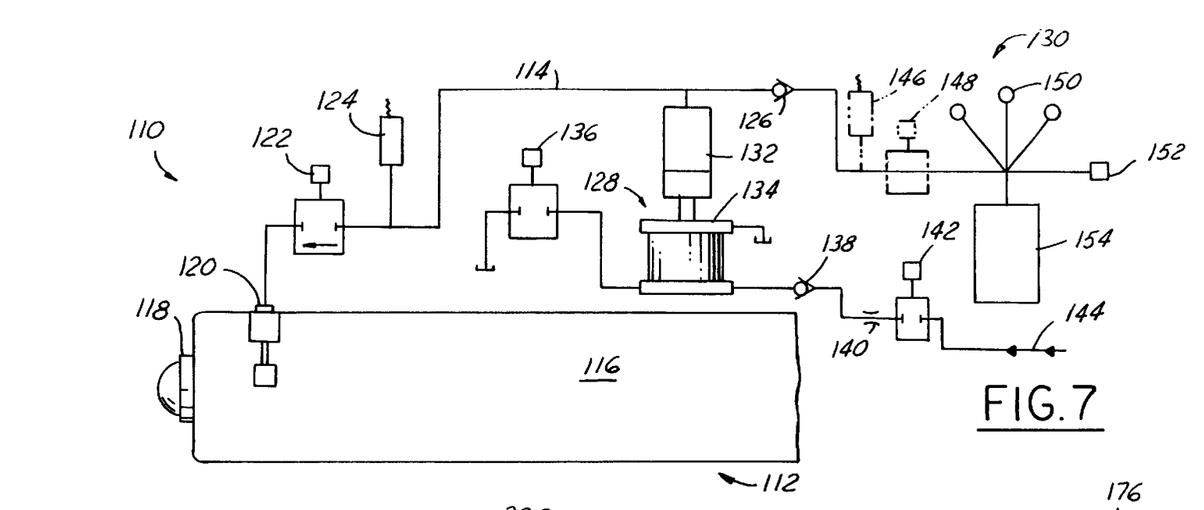
FIG. 7 is a partial view of an exemplary gas assisted injection molding barrel and an associated diagrammatic view of a controller.

With respect to FIG. 7, an apparatus according to the present invention, generally illustrated as 110, includes an injector assembly, generally illustrated as 112, and a controller diagram, generally illustrated as 114. The injector assembly 112 includes a barrel assembly 116 and a nozzle 118. A gas injection pin assembly 120 is shown fitted to the barrel of the barrel assembly 116. It is to be understood that configuration of the assembly 112 may be altered from the configuration illustrated and that only an exemplary form is shown.

The controller 114 preferably includes a gas directional valve 122, a pressure switch 124 to signal when the desired gas pressure is achieved, and a hydraulic check valve 126. The controller 114 also includes a gas pressure circuit, generally illustrated as 128, and a gas supply circuit, generally illustrated as 130.

The gas pressure circuit 128 includes a gas chamber 132, a hydraulic cylinder 134 (having, for example, a 2-inch bore and a 10-inch stroke), a hydraulic directional valve 136, a hydraulic check valve 138 to vent accumulated oil from the hydraulic cylinder 134, a hydraulic flow control valve 140, a hydraulic directional valve 142 to pressurize the hydraulic cylinder 134, and a hydraulic line 144 from a plastic injection circuit (not shown) that injects the accumulated plastic into the front end of the barrel assembly 116 using a rotatable screw in the barrel (both to be described below) to drive the gas-plastic combination from the barrel assembly 116 through the nozzle 118 and into the mold cavity (not shown).

The gas supply circuit 130 includes a gas pressure valve array 150, a gas pump 152, and a supply of inert gas 154. Nitrogen is preferred, although other inert gases could be used as well. If desired, a pressure switch 146 to signal when the pressure in the gas chamber 132 has reached its predesignated pressure value and a gas directional valve 148 for recharging the gas chamber 132 after its gas is exhausted, can also be provided in the alternative.

Figure 8:
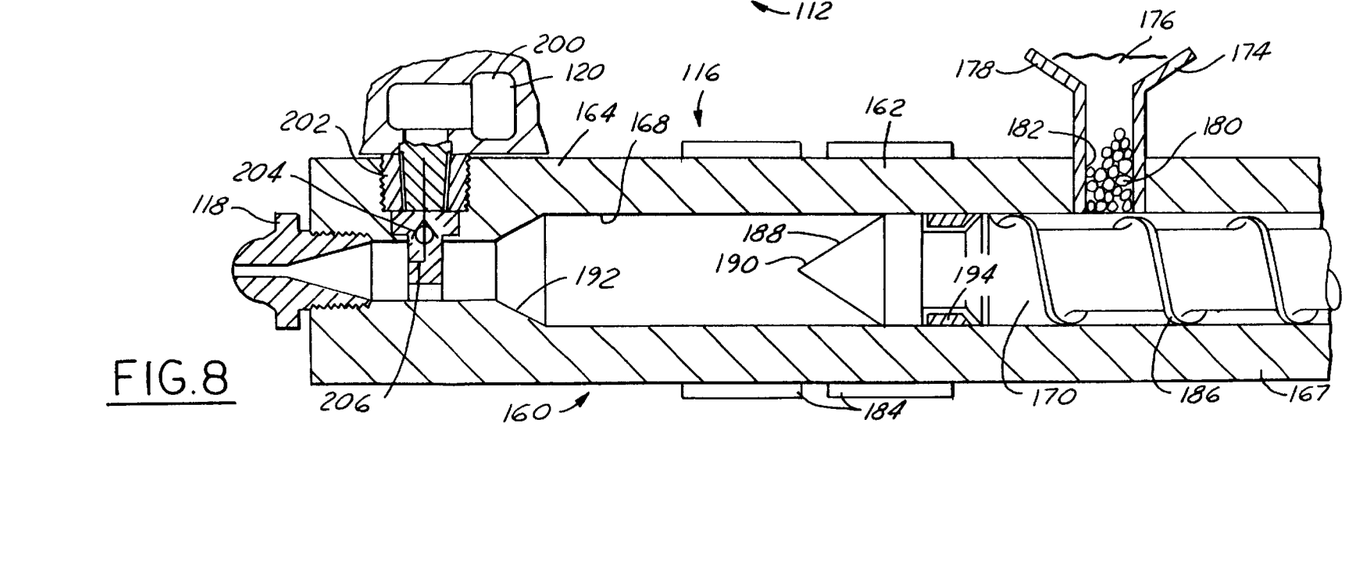
FIG. 8 is a cross-sectional view of the barrel of an embodiment of the present invention illustrating the screw in its pre-injection position.

FIG. 8 illustrates a cross-sectional view of the injector assembly 116 in its pre-injection position. The assembly 116 comprises at least one extruder 160. The extruder 160 includes an extruder barrel 162 with a front end 164. Between the front end 164 of the extruder barrel 162 and the mold (not shown) is fitted the nozzle 118. The nozzle 118 substantially rests against the sprue bushing (also not shown) of the mold as commonly known in the art. The extruder barrel 162 further includes a back or rear end 167.

An axially-formed elongated chamber 168 is formed within the extruder barrel 162 between the front end 164 and the back end 167. An elongated screw ram 170 is rotatably and longitudinally movably positioned within the elongated chamber 168. Movement of the elongated screw ram 170 is effected by a hydraulic mechanism (not shown). The hydraulic mechanism is of a conventional type that is known in the art and is capable of driving the elongated screw ram 170 rotationally with respect to the elongated chamber 168. (The elongated screw ram 170 is also capable of moving axially, as will be described below with respect to FIGS. 10 through 13.)

In alternate embodiments, it is also possible to utilize electric or pneumatic power sources to inject the plastic and gas into the mold.

A hopper 174 adapted for receiving a quantity of solid plastic pellets 176 is fitted to the extruder barrel 162. The plastic hopper 174 comprises a funnel-like body 178 having an outlet 180 that is mated to the extruder barrel 162 at an aperture 182 formed in the side of the extruder barrel 162. One or more heater bands 184 are fitted to the outer side of the extruder barrel 162 for heating the elongated barrel 162. The solid plastic pellets 176 enter the elongated chamber 168 from the plastic pellet hopper 174 through the aperture 182 in a manner that is known to those skilled in the art. The elongated screw ram 170 has a thread 186 formed thereon which forms flights which, upon rotation of the elongated screw ram 170, advance the plastic pellets toward the front end 164 of the extruder barrel 162. The solid plastic pellets 176 are melted and plasticized during their travel by heat from the extruder barrel 162 caused by the heater bands 184.

The elongated screw ram 170 includes a screw tip 188 having a convex conical surface 190. The convex conical surface 190 is matable with a concave conical surface 192 that defines the front end of the elongated chamber 168. A plastic check ring 194 is formed between the screw tip 188 and the thread 186. When the elongated screw ram 170 is in its between-cycles position, the convex conical surface 190 of the screw tip 188 substantially nests against the concave conical surface 192.

The gas injection pin assembly 120 preferably includes a gas fitting 200, an adapter plug 202, a check valve 204 (ball and cone), and a gas pin 206. Alternate embodiments of the gas pin 206 can be utilized as known in the art. The type illustrated in FIG. 8 is suggestive only, but is not to be deemed limiting. In this regard, a plastic and gas injection mechanism used with a valve-gate bushing is shown in U.S. Pat. No. 5,882,693 and can be utilized to inject gas and plastic into a mold in accordance with the present invention. The disclosure of U.S. Pat. No. 5,882,693 is hereby incorporated by reference herein.

Figure 9:
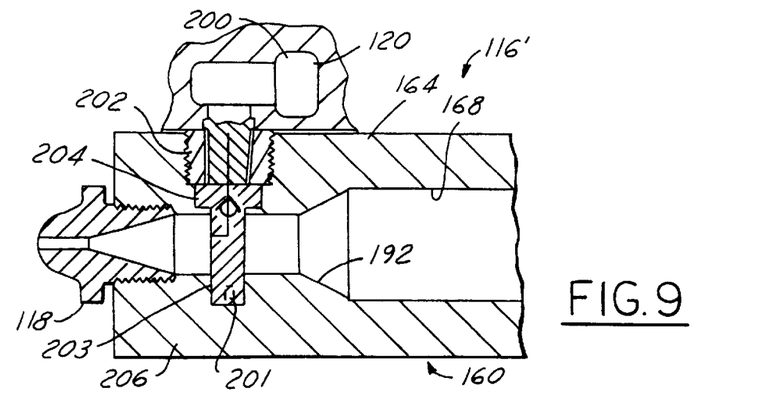
FIG. 9 is a cross-sectional of the barrel of an alternate embodiment of the present invention similar to the embodiment shown in FIG. 8 but illustrating an alternate version of the gas pin.
Figure 10:
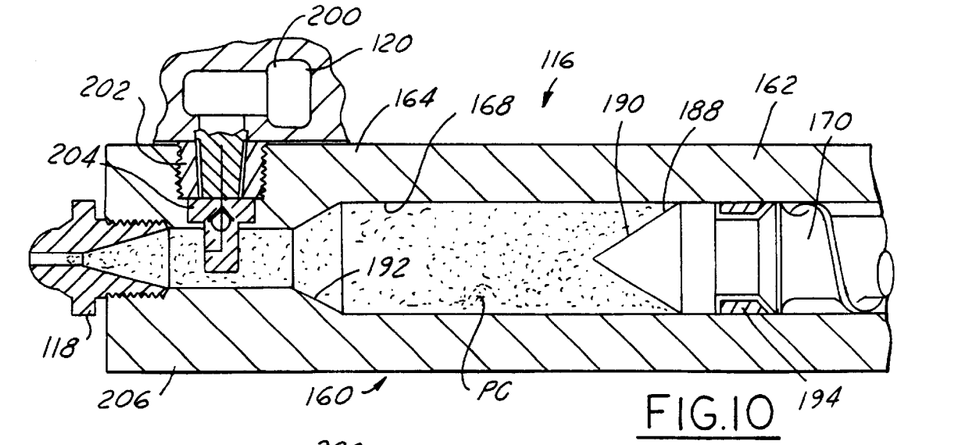
FIG. 10 is a cross-sectional view of a barrel similar to that of FIG. 8, but illustrating the insertion of a charge of molten plastic material positioned between the forward end of the screw and the forward end of the barrel.

FIG. 9 is a cross-sectional of the barrel of an alternate embodiment of the present invention similar to the embodiment shown in FIG. 8 but illustrating an alternate version of the gas pin, illustrated as 201, which has a distal end 203, which extends through the axial thermoplastic flow bore formed in a barrel assembly 116'. The function of the elongated pin 201 is similar to that of the assembly of FIG. 8.

As noted above, several types of thermoplastic resins can be used according to the present invention. By way of illustration, the method can be applied not only to general purpose plastics such as polyolefins, polystyrene, ABS resins, AS resins, PVC resins, methacrylic resins, and fluorine-based resins, but also engineering plastics such as nylon, saturated polyester resins, polycarbonate resins, polyacetal resins, polysuffones, and modified polyphenylene ether resins. The method can also be used with fiber-reinforced resins.

Referring to FIGS. 10 through 13, an injection cycle according to a preferred embodiment of the gas assisted injection molding apparatus of the present invention is illustrated. Specifically with respect to FIG. 10, a cross-sectional view of the injection assembly 116 is illustrated and shows a predetermined quantity or charge of plastic (generally illustrated as "PC") injected into the front end 164 of the extruder 162. (At the beginning of the cycle, the tip 188 of the screw 170 was bottomed out against the wall 192 of the extruder 162. As the screw 170 is rotated, the plastic enters the extruder 162 between the tip 188 of the screw 170 and the wall 192, driving the screw 170 away from the wall.) The amount of the plastic charge is reduced by the desired volume of gas determined according to a method which appears below.

Figure 11:
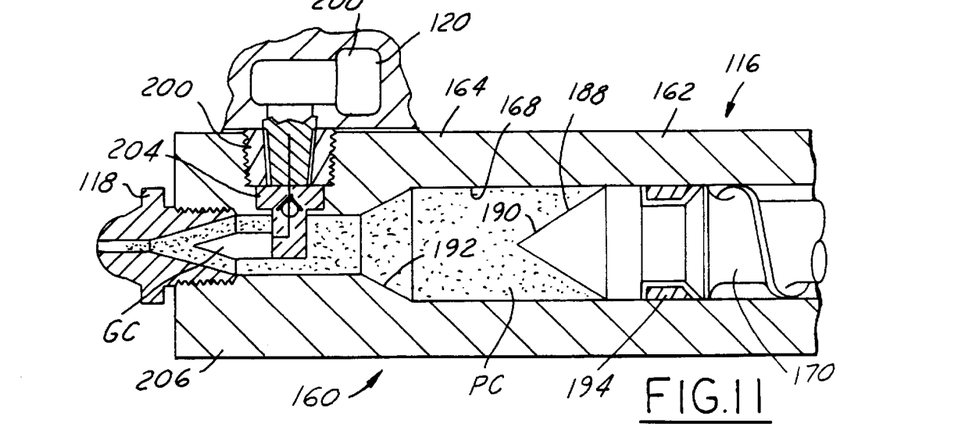
FIG. 11 is a cross-sectional view of the barrel similar to that of FIG. 10 but illustrating the screw having been advanced slightly toward the end of the barrel and a charge of gas inserted into the plastic charge as the plastic charge is moved into the mold cavity (not shown)

The plastic charge is then injected into the mold by moving the screw 170 forward toward the wall 192. At any point in the injection stroke, a measured amount of gas is inserted into the plastic charge through the pin assembly 120 using the same hydraulic pressure used to move the screw 170 to inject the plastic out of the extruder-162. This step is illustrated in FIG. 11 in which the gas charge (generally illustrated as "GC") has been inserted into the plastic charge. The increase of the gas pressure to match the plastic pressure is accomplished by operation of the hydraulic cylinder 134 (shown in FIG. 7) compressing the gas in the gas chamber 132 to an equal value to the pressure of the plastic charge. The power to move the hydraulic cylinder 134 is flow coupled to the hydraulic pressure used to inject the plastic out of the extruder 62. Accordingly, the pressure of the gas charge is either exactly or substantially the same as the pressure of the plastic charge. The result is the simultaneous injection of plastic and gas into the mold cavity.

Figure 12:
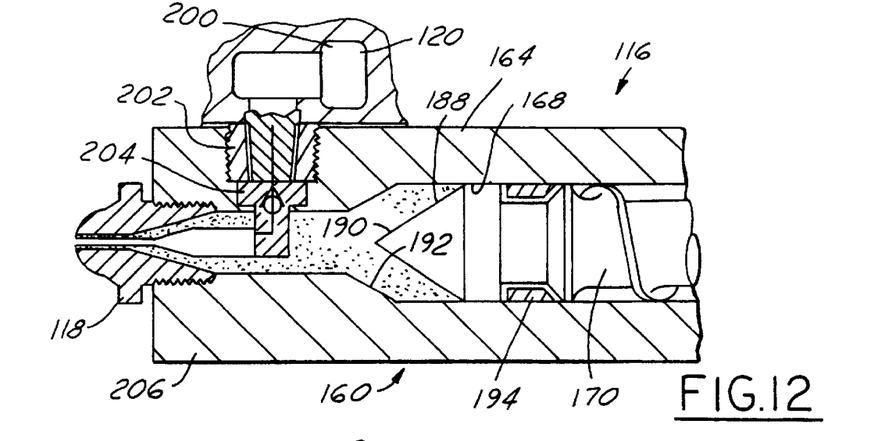
FIG. 12 is a cross-sectional view of the barrel similar to that of FIG. 11 but illustrating the screw having been advanced even further toward the end of the barrel and a charge of gas continuing to be inserted into the plastic charge as the gas-plastic combination exits the injector assembly.
Figure 13:
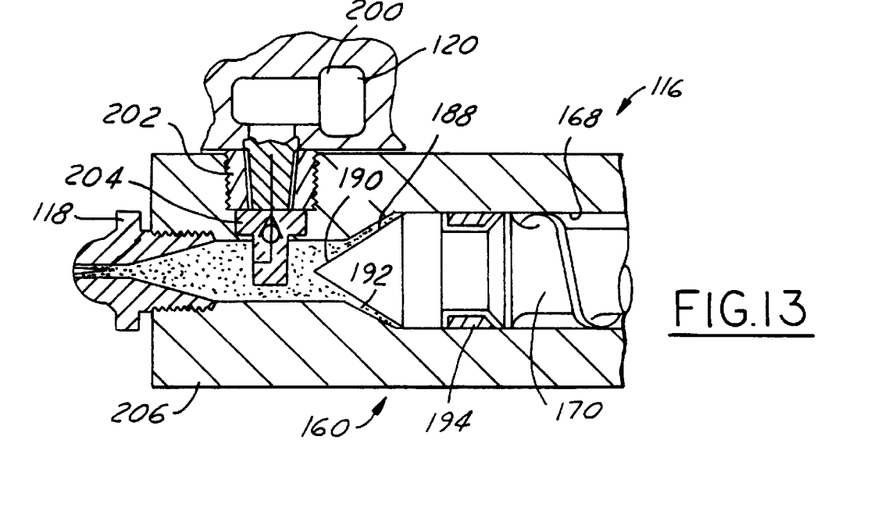
FIG. 13 is a cross-sectional view of the barrel similar to that of FIG. 12 but illustrating the screw having bottomed out against the interior end wall of the barrel and the last remnants of the plastic charge being injected into the mold cavity.

FIG. 12 illustrates the gas-plastic combination leaving the nozzle 118 as it enters the mold cavity. At a selected time prior to the bottoming-out of the tip 190 of the screw 170 against the wall 192, the gas supply can be shut off and the gas-plastic combination halted in favor of an all-plastic flow. This is illustrated in FIG. 13.

The present invention relies on a preferred way to control the volume of gas require for the molding operation. In general, a preselected volume of gas is compressed, the quantity being limited to the capacity of the compression chamber.

EXAMPLE

Initially the chamber 132 is filled with gas to reach a predetermined pressure. A suggested chamber size might be 2-inch bore by 10-inch stroke, producing a total volume of 31.41 cubic inches. (The bore and stroke dimensions may, of course, be larger or smaller as required.) A gas pressure of 200 psi. is then created in the gas chamber. Assuming that 5,000 psi. is required to inject the gas into the pressurized plastic charge while the plastic is being injected, a necessary amount of gas is selected to overcome the pressure of the plastic charge. The amount of gas may be selected from anywhere, for example, between 20 percent and 90 percent of the total gas-plastic charge.

The gas and plastic are injected using the same power source. This contrasts significantly with regular gas assisted injection molding in which the gas is driven by a first independent power source and the plastic with a second independent source. In known arrangements, it is impossible to match the two separated power sources as one will naturally overcome the other. The present invention overcomes this limitation by providing a single power source and a combined flow.

Once the molded article has cooled and hardened, the gas in the mold is vented in any conventional manner, for example, by sprue break, by cutting a hole in the part, or by venting the gas back through the nozzle. The vented gas can be captured and reclaimed, or it can be discharged into the atmosphere.

Figure 14:
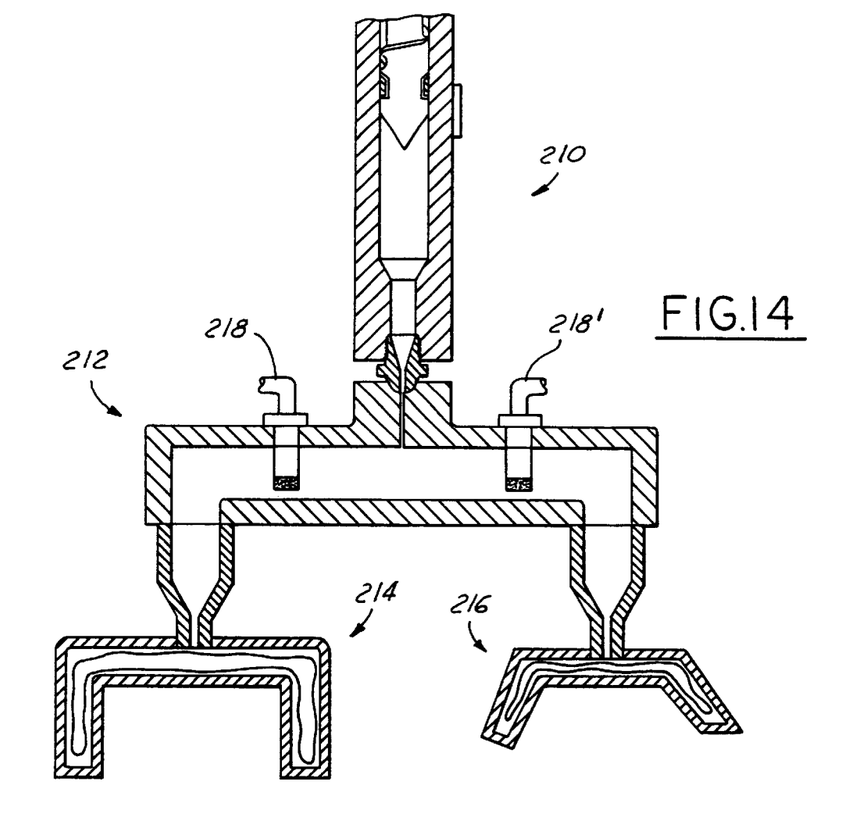
FIG. 14 is an alternate embodiment of the apparatus of the present invention showing a sectional view of an injector operatively positioned against a hot manifold and a pair of gas injector pins positioned thereon.

FIG. 14 illustrates an alternate embodiment of the present invention. According to this embodiment, an injector assembly, generally illustrated as 210, is positioned against a hot runner manifold, generally illustrated as 212, which is itself generally positioned against a plurality of molds 214, 216 (only two of which are illustrated). Hot runner manifolds are well known in the art and need no further description here. The hot runner manifold 212 is fitted with one or more gas injection pins 218, with two pins 218, 218' being illustrated in FIG. 14. The pins 218, 218' are fluidly connected with the gas circuit discussed above with respect to FIG. 7. Operation of the embodiment of FIG. 14 is along the lines of the arrangement discussed above with respect to FIGS. 9 through 12.

Figure 15:
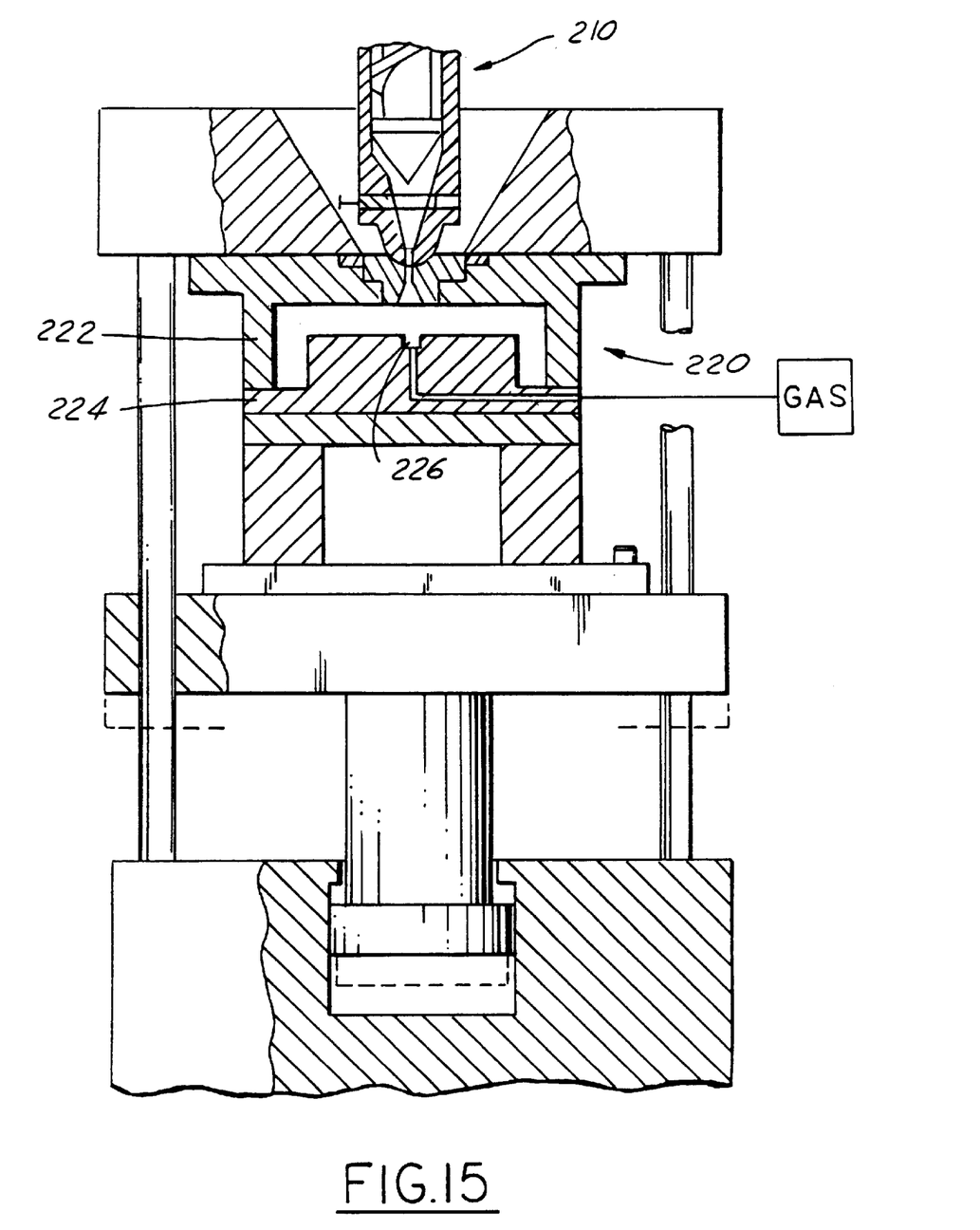
FIG. 15 is another alternate embodiment of the apparatus of the present invention showing a sectional view of the injector operatively positioned against a mold and a gas pair of gas injector pins positioned thereon.

FIG. 15 illustrates another alternate embodiment of the present invention. According to this embodiment, the injector assembly 210, is positioned against a mold, generally illustrated as 220. The mold includes a first half 222 and a second half 224. One of the halves 224 is provided with one or more gas injection inlets 226 (which may be gas pins similar to those shown in FIG. 14). As with the pins 218, 218' of FIG. 14, the inlet 226 is fluidly connected with the gas circuit discussed above with respect to FIG. 7. Operation of the embodiment of FIG. 15 is also along the lines of the arrangement discussed above with respect to FIGS. 9 through 12.

Figure 16:
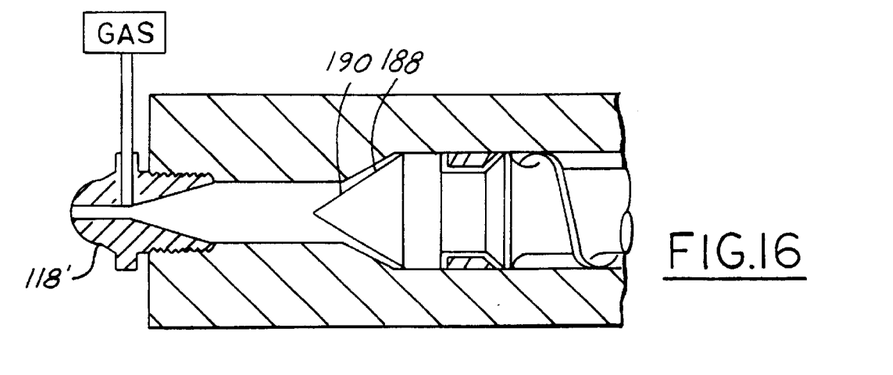
FIGS. 16 and 17 are alternate embodiments of the invention similar to FIGS. 13 and 14 but with gas injector devices positioned in the nozzle and sprue bushing, respectively.
Figure 17:
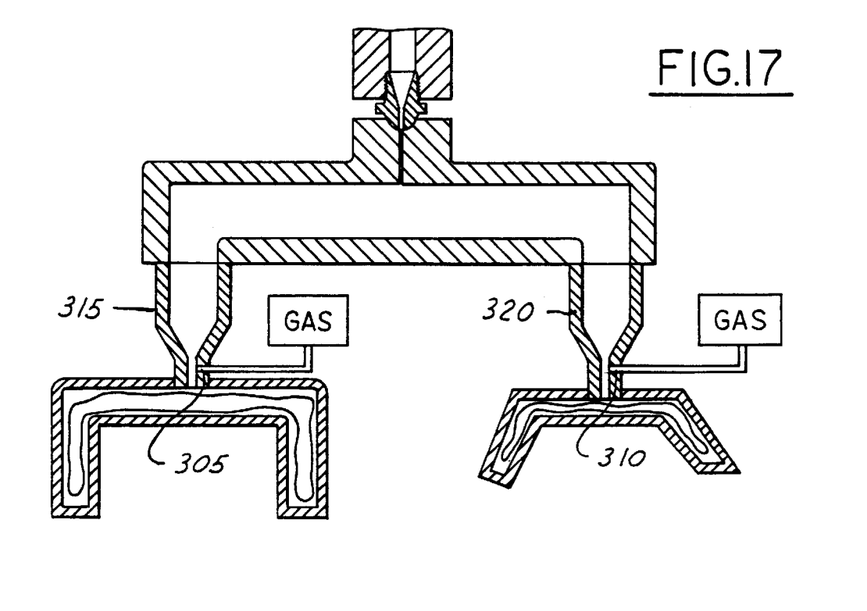

FIGS. 16 and 17 illustrate still further embodiments of the invention. FIG. 16 is similar to FIG. 13, but with the gas injector pin being positioned in nozzle 118' rather than the barrel. FIG. 17 is similar to FIG. 14, but with the gas injection pins 305 and 310 positioned in the sprue bushings 315 and 320, respectfully.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A method for creating a substantially hollow plastic article including the steps of:
   providing an injection molding apparatus having a plastic material injection assembly and a gas injection mechanism, said assembly including an extruder barrel having an injection end, and a screw, said mechanism including a gas injection member;
   using a power source to place a quantity of plastic material into said extruder barrel;
   injecting said plastic material into a mold cavity utilizing said power source;
   injecting a quantity of gas into the plastic material with said power source, said injection of gas being metered by a flow control device to control the speed of flow of the gas into the plastic material.

2. The method as set forth in claim 1 wherein the speed of said flow of gas is less than the speed of flow of said plastic material into said mold cavity.

3. The method as set forth in claim 1 wherein the speed of said flow of gas is more than the speed of flow of said plastic material into said mold cavity.

4. The method as set forth in claim 1 wherein the speed of said flow of gas is the same as the speed of flow of said plastic material into said mold cavity.

5. The method as set forth in claim 1 wherein said gas is injected into said plastic material after 1%–99.9% of the plastic material has been injected out of said extruder barrel and into the mold cavity.

6. The method as set forth in claim 1 further comprising the step of stopping and then restarting the injection of gas into the plastic material.

7. The method as set forth in claim 1 wherein said gas is continued to be injected into the plastic material in the mold cavity after all of the plastic material has been injected into said mold cavity.

8. The method as set forth in claim 1 wherein said injection of gas is continued until said screw in said extruder barrel has bottomed out.

9. The method as set forth in claim 1 further comprising the step of controlling the final pressure of gas in said mold cavity.

10. The method as set forth in claim 9 wherein said final pressure of gas in said mold cavity is controlled by the pre-pressurization of the initial volume of gas.

11. The method as set forth in claim 1 further comprising pressurizing the gas prior to injecting it into said plastic material.

12. The method as set forth in claim 1 further comprising accumulating a predetermined volume of gas prior to injecting it into said plastic material.

13. The method as set forth in claim 1 wherein said step of injecting said quantity of plastic material from said barrel is determined by the distance traveled by said screw.

14. The method as set forth in claim 1 wherein said quantity of gas is injected from a compression chamber with a moveable piston and said quantity of gas is fully injected into said plastic material when said piston has traveled its full stroke in said compression chamber.

15. The method as set forth in claim 14 further comprising the step of having said piston in said compression chamber travel its full distance during injection of the gas into said plastic material during each injection cycle.

16. The method as set forth in claim 15 wherein said piston is moved to its full bottom position by said quantity of gas to be injected into said plastic material.

17. The method as set forth in claim 16 wherein all of said gas accumulated in said compression chamber is injected into said plastic material during each injection cycle.

18. The method as set forth in claim 1 wherein the plastic material is injected into said mold cavity and said gas is injected into said flowable plastic material at the same pressure.

19. The method as set forth in claim 1 further comprising the step of venting the gas from said hollow plastic article.

20. The method as set forth in claim 19 wherein said gas is vented by a sprue break.

21. The method as set forth in claim 19 wherein said gas is vented by forming an opening in the hollow plastic article.

22. The method as set forth in claim 19 further comprising the step of capturing and reclaiming the vented gas.

23. The method as set forth in claim 1 wherein said injection of gas into said flowable material is pressure switch controlled.

24. The method as set forth in claim 1 wherein said power source is hydraulic.

25. The method as set forth in claim 1 wherein said power source is pneumatic.

26. The method as set forth in claim 1 wherein said power source is electric.

27. A method for creating a hollow plastic article comprising the steps of:
    providing an injection molding apparatus having an injection assembly with an extruder barrel having an injection end, a gas port in said barrel and a rotating and longitudinally moveable screw positioned in said barrel;
    forming a quantity of molten plastic material in said barrel;
    injecting said quantity of molten plastic material with a power source from said barrel and into an article defining mold cavity;
    injecting a quantity of gas through said gas port and into said molten plastic material in said barrel utilizing said same power source, said molten plastic material and said gas being simultaneously injected into said mold cavity to form said hollow plastic article; and
    controlling the speed of flow of said gas into said molten plastic material.

28. The method as set forth in claim 27 wherein the speed of flow of said gas into said molten plastic material is metered by a flow control device.

29. The method as set forth in claim 27 wherein the speed of flow of said gas is less than the speed of flow of said molten plastic material into said mold cavity.

30. The method as set forth in claim 27 wherein the speed of flow of said gas is more than the speed of flow of said molten plastic material into said mold cavity.

31. The method as set forth in claim 27 wherein the speed of flow of said gas is the same as the speed of flow of said molten plastic material into said mold cavity.

32. A method for creating a hollow injection molded plastic article comprising the steps of:
    providing an injection molding apparatus and a mold with an article defining cavity, said injection molding apparatus having an extruder barrel, nozzle, and screw;
    forming a quantity of molten plastic material in said barrel;
    injecting said molten plastic material with a power source from said barrel and into said mold cavity;
    injecting a quantity of gas into said molten plastic material with same said power source;
    said molten plastic material and said gas being introduced at the same time and at the same pressure into said mold cavity; and
    controlling the speed of flow of said gas into said molten plastic material.

33. The method as set forth in claim 32 wherein said molten plastic material is injected by longitudinal movement of said screw in said barrel.

34. The method as set forth in claim 32 wherein said gas is supplied from a compression chamber with a moveable piston.

35. The method as set forth in claim 32 wherein said injection molding apparatus further comprises a manifold and hot runner mechanism and wherein said gas is introduced into said molten plastic material in said barrel, nozzle, or manifold and hot runner mechanism.

36. The method as set forth in claim 32 wherein said gas is supplied from a fixed volume chamber.

37. The method as set forth in claim 32 wherein said gas is supplied from a gas chamber.

38. The method as set forth in claim 32 wherein said fixed volume chamber is made variable by changing the pressure of the gas initially supplied to the chamber.

39. The method as set forth in claim 32 wherein the speed of flow of said gas into said molten plastic material is metered by a flow control device.

40. The method as set forth in claim 32 wherein the speed of flow of said gas is less than the speed of flow of said molten plastic material into said mold cavity.

41. The method as set forth in claim 32 wherein the speed of flow of said gas is more than the speed of flow of said molten plastic material into said mold cavity.

42. The method as set forth in claim 32 wherein the speed of flow of said gas is the same as the speed of flow of said molten plastic material into said mold cavity.

* * * * *